United States Patent [19]
Messina

[11] 4,167,284
[45] Sep. 11, 1979

[54] COLLAPSIBLE CAMPERS

[76] Inventor: Roland Messina, 122-05 111th Ave. S., Ozone Park, N.Y. 11420

[21] Appl. No.: 895,910

[22] Filed: Apr. 13, 1978

[51] Int. Cl.² ............................................. B60P 3/32
[52] U.S. Cl. .................................. 296/171; 224/309; 296/27
[58] Field of Search ................ 296/23 R, 23 A, 23 E, 296/23 H, 26, 27, 37.1, 37.7, 23 C; 224/29 R, 42.1 R

[56] References Cited

U.S. PATENT DOCUMENTS

| | | | |
|---|---|---|---|
| 3,492,042 | 1/1970 | Nachtigall | 296/26 |
| 3,506,300 | 4/1970 | Remmert | 296/27 |
| 3,514,148 | 5/1970 | Hunter | 296/27 |
| 3,583,755 | 6/1971 | Hedrick | 296/27 |

Primary Examiner—Joseph F. Peters, Jr.
Assistant Examiner—John A. Carroll
Attorney, Agent, or Firm—Lawrence Rosen; E. Janet Berry

[57] ABSTRACT

A collapsible camper includes a base having a floor and enclosing wall panels as well as a rigid roof member capable of being raised and lowered relative to the base. The base is mounted upon a wheel and axle assembly. The roof member is constructed so as to have a storage compartment therewithin for the storage of at least one bed member such as a bed board. Cooperable elements are carried by the bed member or members and by walls of the roof member for guiding the bed members into the storage compartment, for retaining the bed members therein and to facilitate removal of the bed members from the compartment.

11 Claims, 6 Drawing Figures

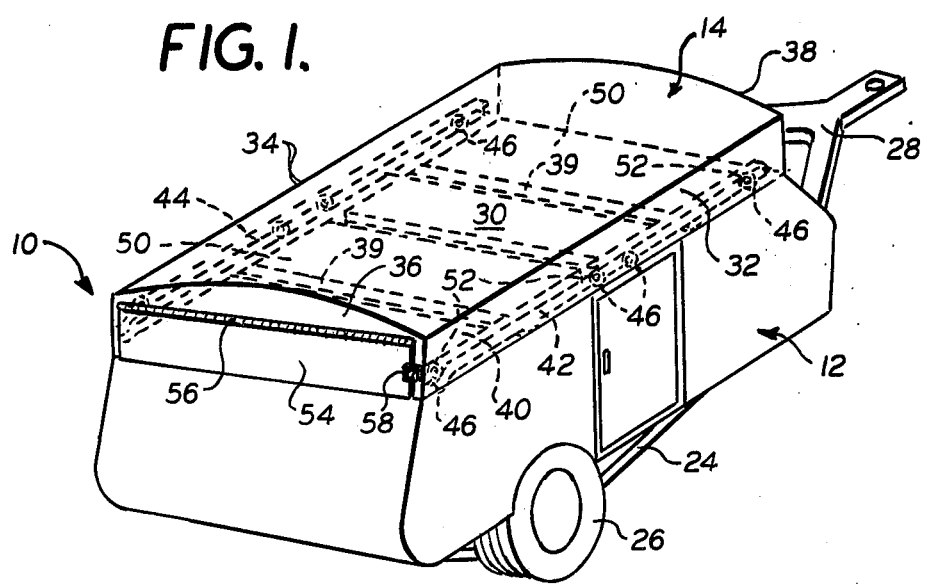
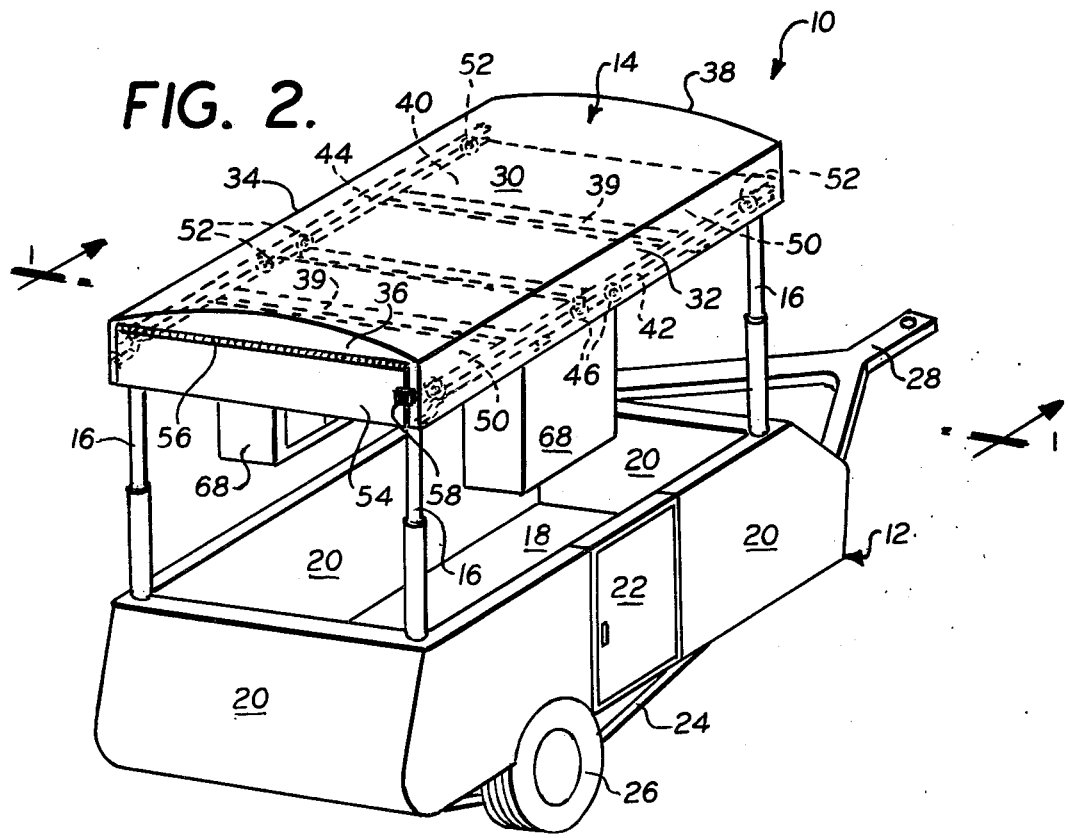
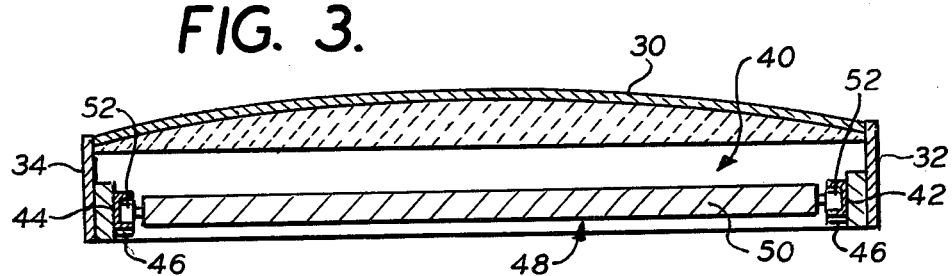

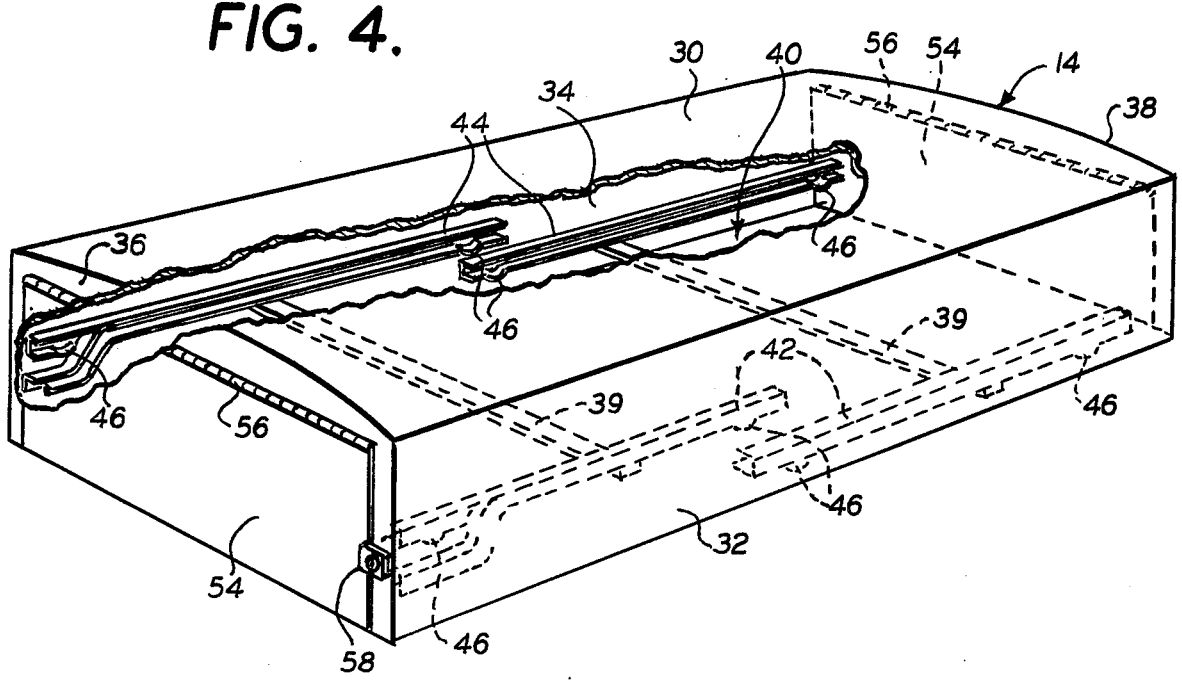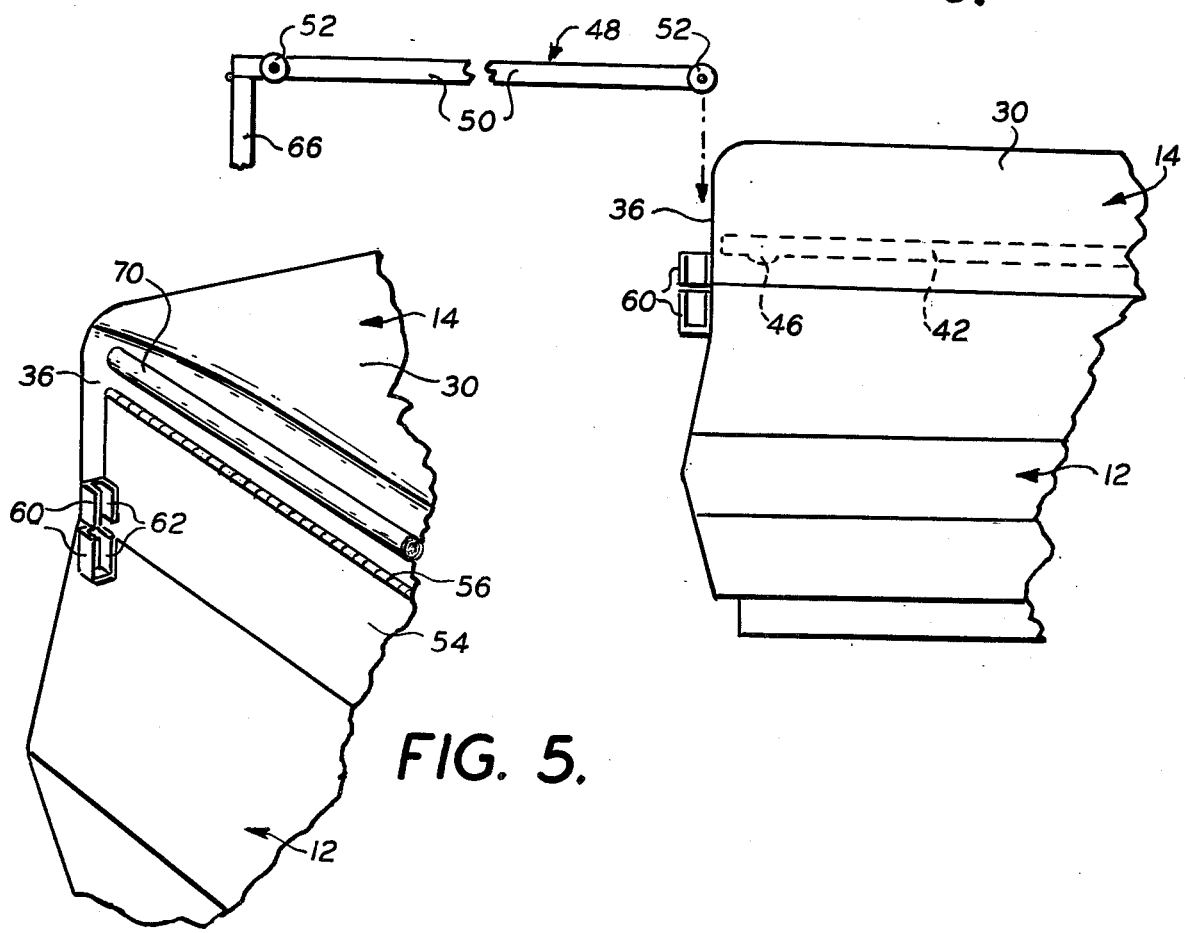

COLLAPSIBLE CAMPERS

BACKGROUND OF THE INVENTION

The present invention relates to callapsible campers of the type having a rigid roof member which is collapsible onto a base when the camper or trailer is to be converted into compact form as when it is to be transported from one location to another while hitched to the back of a vehicle.

As is well known, camping has become one of the most popular pastimes in recent years especially with families. It is thus commonplace for an entire family to travel across the country stopping at roadside areas particularly designated for the parking of campers or trailers or at other suitable campsites where the family can spend the night. Once at such a campsite the camper is converted from its collapsed to an erected condition by raising the roof member to afford cover and privacy. At such times the beds or bunks are withdrawn from their retracted position which is generally within the base or wall panels of the camper and are set up for sleeping. As will be appreciated, the camper not only carries the beds in stored position but also cabinet space, seating, a stove, a sink, and other utilities required for everyday living by the family. It will be apparent that space within the camper structure is at a premium, and the need to devote space for the storage of the beds or bunks within the base or wall panels thereof consequently reduces the availability of the existing space for the other facilities which might otherwise advantageously occupy the areas taken by the beds. Although various expedients have been resorted to in an attempt to minimize the amount of space required for storage of the beds the commonly accepted solution has been to provide for retraction of the beds into recesses formed in the wall panels of the base or within the dinette area beneath the roof member when it is in its collapsed condition. Such prior attempts to resolve the space problem have thus been not altogether satisfactory and have not led to optimum utilization of the available space within the camper. A typical known collapsible camper or trailer construction is disclosed in U.S. Pat. No. 3,583,755 issued June 8, 1971 to Robert T. Hedrick, Jr.

SUMMARY OF THE INVENTION

It is one object of this invention to provide a camper or trailer that is capable of being collapsed when not in use to facilitate transit of same from one location to another in the tow of a vehicle in which provision is made for the storage of the beds or bunks in a manner which does not require retraction of such beds or bunks into either the wall panels of the base or into the dinette area when the camper is collapsed.

It is another object of the invention to provide a camper or trailer capable of being collapsed for facile transit from one location to another in which the base of the camper need not be encumbered with tracks and other space-consuming mechanisms for the retraction and withdrawal of the bunks or beds.

It is a further object of the invention to provide for permanent overhead cabinets within the camper which need not be disassembled and reassembled or repositioned as the camper is converted from erected to collapsed condition and vice versa.

It is yet another object of the invention to afford use of the entire dinette area of the camper when in its erected state unencumbered by the beds or bunks whether in their retracted or withdrawn position.

Other objects and advantages of the invention will become readily apparent to persons versed in the art to which the invention pertains from the ensuing description of the invention.

In accordance with the invention there is provided in a collapsible camper having a base which includes a floor, wall panels, a rigid roof member capable of being raised and lowered relative to the base, and at least one bed member movable from a first storage position to a second withdrawn position for use, the improvement comprising:

a rigid roof member having top, side and end walls defining therewithin a storage compartment for at least one bed member;

guide means carried by the side walls of said roof member for guiding and retaining at least one bed member in said compartment;

and at least one bed member dimensioned for positioning within said storage compartment, including means thereon cooperable with said guide means on the side walls of said roof member to permit guided movement of the bed member for storage within said compartment and for withdrawal of the bed member therefrom.

BRIEF DESCRIPTION OF THE DRAWINGS

In order that the invention may be more fully comprehended it will now be described, by way of example, with reference to the accompanying drawings in which:

FIG. 1 is a perspective view of a camper constructed in accordance with this invention when in its collapsed condition;

FIG. 2 is a view of the camper shown in FIG. 1 when in its erected condition;

FIG. 3 is an end cross-sectional view of the roof member of the camper showing a bed member in its storage position therewithin and taken along line 1—1 of FIG. 2;

FIG. 4 is a perspective isolated view of the roof member partly broken away to show one preferred arrangement for guide track elements and also depicting a construction for locking of the bed member in its storage position;

FIG. 5 is a perspective fragmentary view of one corner of the roof member showing bracket elements for supporting one end of a bed member in a position of use after removal of the bed member from within the roof member; and FIG. 6 is a fragmentary side elevational view of the end of the camper shown in FIG. 5 with the bed member poised above the roof member ready to be lowered into supportive position in the bracket elements.

DESCRIPTION OF THE PREFERRED EMBODIMENTS

Referring to the drawings there is shown a camper or trailer identified generally by reference numeral 10. The camper has a base 12 which is supportive of a rigid roof member 14 in both the collapsed and raised or erected conditions thereof. A plurality of telescoping rods 16 or the like may be employed in support of the roof member. However, it will be understood that any conventional mechanism may be utilized to support the roof member upon the base so as to permit the raising and lowering of such roof member. The base 12 includes a floor 18 and wall panels 20 one or more of which wall panels may be provided with a door 22 for entry into the dinette area defined by such wall panels. The base is mounted in known manner upon a spring structure 24 which may be part of a wheel assembly 26. A hitch of conventional construction 28 is carried by the front of the camper so that the camper may be secured to a vehicle (not shown) for towing. The camper as depicted in FIG. 1 can thus be easily transported in compact condition from one campsite to another.

As can be seen most clearly from FIG. 2, the roof member 14 includes top wall 30, opposed side walls 32, 34 and opposed end walls 36, 38. Desirably a plurality of support bars or rods 39 extend between the side walls to provide additional rigidity to the roof structure. Beneath the top wall and between the end and side walls there is defined a storage compartment 40 for the storage of at least one bed or bunk member. As stated previously, the roof member is mounted upon the base in any conventional manner such as by means of telescopable rod elements 16 or the like so as to enable the selective raising and lowering thereof between the collapsed and erected conditions shown in FIGS. 1 and 2 respectively. The specific mechanism for extension and retraction of the rod elements 16 has not been shown since such mechanisms do not form part of this invention and many types of such mechanisms are well known to persons skilled in this art. Inclusion of such details is thus considered unnecessary for a complete understanding of the invention and would only serve to needlessly encumber the description.

Within storage compartment 40 guide track or rail elements 42, 44 are mounted on the inner surfaces of the opposed side walls 32, 34. Such track elements may extend horizontally along the side walls or they may be inclined angularly. The latter arrangement may be employed to advantage in smaller size campers and trailers since less longitudinal space will be required for storage of the beds or bunks. Another preferred arrangement for the tracks or rails is shown in FIG. 4 where upper and lower track elements are mounted on each of the opposed side walls. Such track elements are vertically spaced by a distance sufficient to accomodate therebetween the bed or bunk member to be carried by the lower of the track elements. The outer ends of the track elements may be bifurcated as can be seen most clearly from FIG. 4 to facilitate removal of the beds from the roof storage compartment.

There is desirably formed on each of the track elements one or more cut-outs or recesses 46 for a purpose which will become apparent. At least one bed or bunk member 48 is provided for sleeping. Such beds or bunks are adapted for storage, when not in use, within compartment 40 upon the track guide elements carried by side walls 32, 34. The bed or bunk member employable with the invention is of generally conventional construction and may simply comprise a bed board 50 of adequate strength to support a person of predetermined size and weight thereon. A sleeping pad or the like (not shown) may be positioned upon or may be an integral part of the bed member. The bed member is given sets of rollers 52 at least at each end thereof. The rollers are dimensioned so as to roll along the track or rail elements 42, 44 which latter elements may be channel members having flanges which define a guide path therebetween. Alternatively flanged rollers may be used that engage rollably over the track elements which, in such event, take the form of rails. It will also be understood that roller element structures may be substituted for the track or rail elements carried by the side walls in order that the beds or bunks may slide over such roller elements into and out of their stored positions. It is further within the contemplation of the invention to eliminate the use of rollers altogether and to simply provide for sliding of the beds into stored position within the roof compartment on the track elements or upon ledge elements carried by the opposed side walls.

When the beds or bunks are retracted into compartment 40 for storage therein the rollers on the beds, when in alignment with recesses 46, will settle into such recesses to retain the bed in place so that no shifting of the bed longitudinally along the track or rail will occur during transit of the camper.

One or both of the end walls 36, 38 may be given an access opening that is dimensioned to permit the passage of bed or bunk members therethrough and with an access door 54 to permit sealing of the compartment for security purposes. Alternatively the entire end wall may take the form of a pivotable access door. The access doors are carried pivotably by the roof member by means such as a piano hinge 56. A latch or locking element 58 of conventional design provides for the selective locking of the access door.

FIG. 5 shows construction for the end wall or walls of the roof member which adapts the roof member for support of one end of a bunk or bed. This construction is, of course, optional. As depicted, one or both end walls of the roof member may be given bracket members 60 which are formed with a vertically extending slot 62 therein. Such slots are dimensioned to receive the roller element 52 carried at one end of the bunk or bed. As can be seen most clearly from FIG. 6, when the bed is to be supported by the roof member for use the bed is elevated above the end of the roof member having the brackets and is then lowered so as to seat the element 52 of the bed in the corresponding bracket 60. Support elements 66 are provided for support of the other end of the bed which support elements may be formed so as to be pivotable on the bed or separate therefrom. The support elements 66 are thus adapted to support the free end of the bed or bunk upon any suitable platform which may be the ground or a support portion of the camper base.

As shown in FIG. 2, at least storage cabinet 68 may be affixed to one or both sides of the roof member to depend therefrom. Such cabinets, when employed, may be permanently installed so as to obviate the need for their assembly and disassembly whenever the roof member is raised or lowered. By providing for storage of the bed or bunk members within the roof compartment 40 the space within the dinette area adjacent wall panels 20 of base 12, conventionally reserved for storage of the beds or bunks, can now be utilized for storage of the cabinets 68. Provision of such additional permanent cabinet space will greatly enhance the livability of the camper without having to enlarge its overall size.

A protective canvas or like flexible sheet element 70 may be mounted internally of the roof member on one or both end walls thereof for the purpose of affording privacy within the dinette area when the camper is in use. The canvas is desirably mounted in the form of a roll which can be easily rolled up when not in use.

Although not illustrated it will be understood that the beds or bunks may be retracted and withdrawn from storage compartment 40 by means such as a chain and sprocket arrangement, rack and pinion, or like means.

However, the beds may simply be manually withdrawn from and positioned in compartment 40. The beds or bunks, when withdrawn from compartment 40, are used under the shelter of the roof member or extensions thereof. One advantage of the construction disclosed herein for storage of the beds is that if the roof member is to be erected at a time when the beds would not ordinarily be put to use, such as during the daylight hours, there is no need to withdraw the beds from the roof compartment, and the beds will not detract from the available living space within the dinette. Also, it is possible to decrease the overall size of the camper without having to reduce the size or number of facilities with which such campers are normally equipped. Further, areas of the camper base which were previously used to house the beds or bunks in their retracted condition are now available for the installation of cabinets and other utilities such as a stove or sink which can be positioned in permanent upright manner within the dinette area together with the necessary plumbing and hardware.

Although the invention has been described in specific terms it will be understood that various changes may be made in size, shape, and in the arrangement of the components without departing from the spirit and scope of the invention as defined in the appended claims.

What is claimed is:

1. In a collapsible camper including a base having a floor, wall panels, a rigid roof member capable of being raised and lowered relative to the base, and at least one bed member movable from a first retracted storage position to a second withdrawn position for use, the improvement comprising:
   a rigid roof member having top, side and end walls defining therewithin in both of its raised and lowered positions a storage compartment for at least one bed member;
   guide means carried by opposed walls of said roof member for guiding and retaining said at least one bed member in said compartment;
   and at least one bed member dimensioned for positioning within said storage compartment, including means thereon cooperable with said guide means to permit substantially horizontal guided movement of the bed member for storage within said compartment and for withdrawal of the bed member therefrom.

2. A collapsible camper according to claim 1, including an access door mounted pivotably on each wall having said access opening, each said access door being provided with locking means for selectively locking said storage compartment.

3. A collapsible camper according to claim 1, wherein said guide means comprise track elements carried by opposed side walls of said roof member and the means on said bed member cooperable with said guide means comprising at least two set of rollers.

4. A collapsible camper according to claim 3, including upper and lower vertically spaced track elements on each of the opposed side walls of said roof member, the respective upper and lower track elements on said side walls each accomodating at least one bed member thereon.

5. A collapsible camper according to claim 3, wherein each said track element includes at least one recess therein for retention of a bed member against longitudinal movement thereof along the track element.

6. A collapsible camper according to claim 4, wherein each said track element includes at least one recess therein for retention of a bed member against longitudinal movement thereof along the track element.

7. A collapsible camper according to claim 1, including at least one storage cabinet non-movably affixed to said roof member to depend therefrom, each said storage cabinet having a height such that the roof member can be lowered onto said base into its collapsed condition without interference of the cabinet with the floor of the base preventing full collapsing thereof.

8. A collapsible camper according to claim 1, including bracket means carried by at least one of the end walls of said roof member, each said bracket means having a vertically extending slot formed therein, and roller means on at least one of said bed members cooperable with said bracket means to be positionable within the slot thereof for support of one end of such bed member on said bracket means when the bed member has been withdrawn from said storage compartment, and support means for the support of the other end of the bed member.

9. In a collapsible camper including a base having a floor, wall panels, a rigid roof member capable of being raised and lowered relative to the base, and at least one bed member movable from a first retracted storage position to a second withdrawn position for use, the improvement comprising:
   a rigid roof member having top, side and end walls defining therewithin in both of its raised and lowered positions a storage compartment for at least one bed member and an access opening in at least one of said side and end walls for substantially horizontal passage therethrough of said at least one bed member;
   guide means carried by opposed walls of said roof member other than those having said access opening therein for guiding and retaining said at least one bed member in said compartment;
   at least one bed member dimensioned for positioning within said storage compartment, including means thereon cooperable with said guide means to permit guided substantially horizontal movement of the bed member for storage within said compartment and for withdrawal of the bed member therefrom;
   and an access door mounted pivotably on each wall having said access opening, each said access door being provided with locking means for selectively locking said storage compartment.

10. A collapsible camper according to claim 9, wherein said guide means comprise track elements carried by opposed side walls of said roof member and the means on said bed member cooperable with said guide means comprise at least two sets of rollers.

11. A collapsible camper according to claim 9, including at least one storage cabinet non-movably affixed to said roof member to depend therefrom, each said storage cabinet having a height such that the roof member can be lowered onto said base into its collapsed condition without interference of the cabinet with the floor of the base preventing full collapsing thereof.

* * * * *